United States Patent
Ha et al.

(10) Patent No.: US 8,675,741 B2
(45) Date of Patent: Mar. 18, 2014

(54) METHOD FOR IMPROVING IMAGE QUALITY AND DISPLAY APPARATUS

(75) Inventors: Tae-hyeun Ha, Suwon-si (KR); Hyung-rae Kim, Seoul (KR); Han feng Chen, Suwon-si (KR); Jun-ho Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 12/236,084

(22) Filed: Sep. 23, 2008

(65) Prior Publication Data

US 2009/0268977 A1 Oct. 29, 2009

(30) Foreign Application Priority Data

Apr. 24, 2008 (KR) .................. 10-2008-0038280

(51) Int. Cl.
*H04N 7/12* (2006.01)

(52) U.S. Cl.
USPC .................................................. 375/240.26

(58) Field of Classification Search
USPC ........... 375/240.01, 240.26; 348/348.1–440.1
IPC ......................................................... H04N 7/12
See application file for complete search history.

(56) References Cited

U.S. PATENT DOCUMENTS

| | | | |
|---|---|---|---|
| 7,693,330 B2* | 4/2010 | So ................................. | 382/174 |
| 7,965,303 B2* | 6/2011 | Hanaoka et al. .............. | 345/606 |
| 8,223,091 B2* | 7/2012 | Ishihara et al. ................ | 345/63 |
| 2007/0018934 A1* | 1/2007 | Kim et al. ........................ | 345/98 |
| 2008/0136752 A1* | 6/2008 | Inoue et al. ..................... | 345/77 |
| 2008/0284881 A1* | 11/2008 | Ikizyan et al. ................ | 348/258 |
| 2008/0309683 A1* | 12/2008 | Kim et al. ..................... | 345/690 |
| 2010/0091042 A1* | 4/2010 | Inoue ............................ | 345/690 |

* cited by examiner

*Primary Examiner* — Dave Czekaj
*Assistant Examiner* — Tracy Li
(74) *Attorney, Agent, or Firm* — Sughrue Mion, PLLC

(57) ABSTRACT

A method of improving image quality and the display apparatus thereof are provided. The method includes generating a plurality of sub-frame images using a frame image depending on whether the frame image is a moving image or a still image and displaying the plurality of sub-frame images sequentially for a frame time interval of the frame image. By generating the plurality of sub-frame image which have different pixel values each other and displaying the plurality of sub-frame image sequentially, the sticking phenomenon may be prevented and a life time of the display apparatus may be extended.

20 Claims, 4 Drawing Sheets

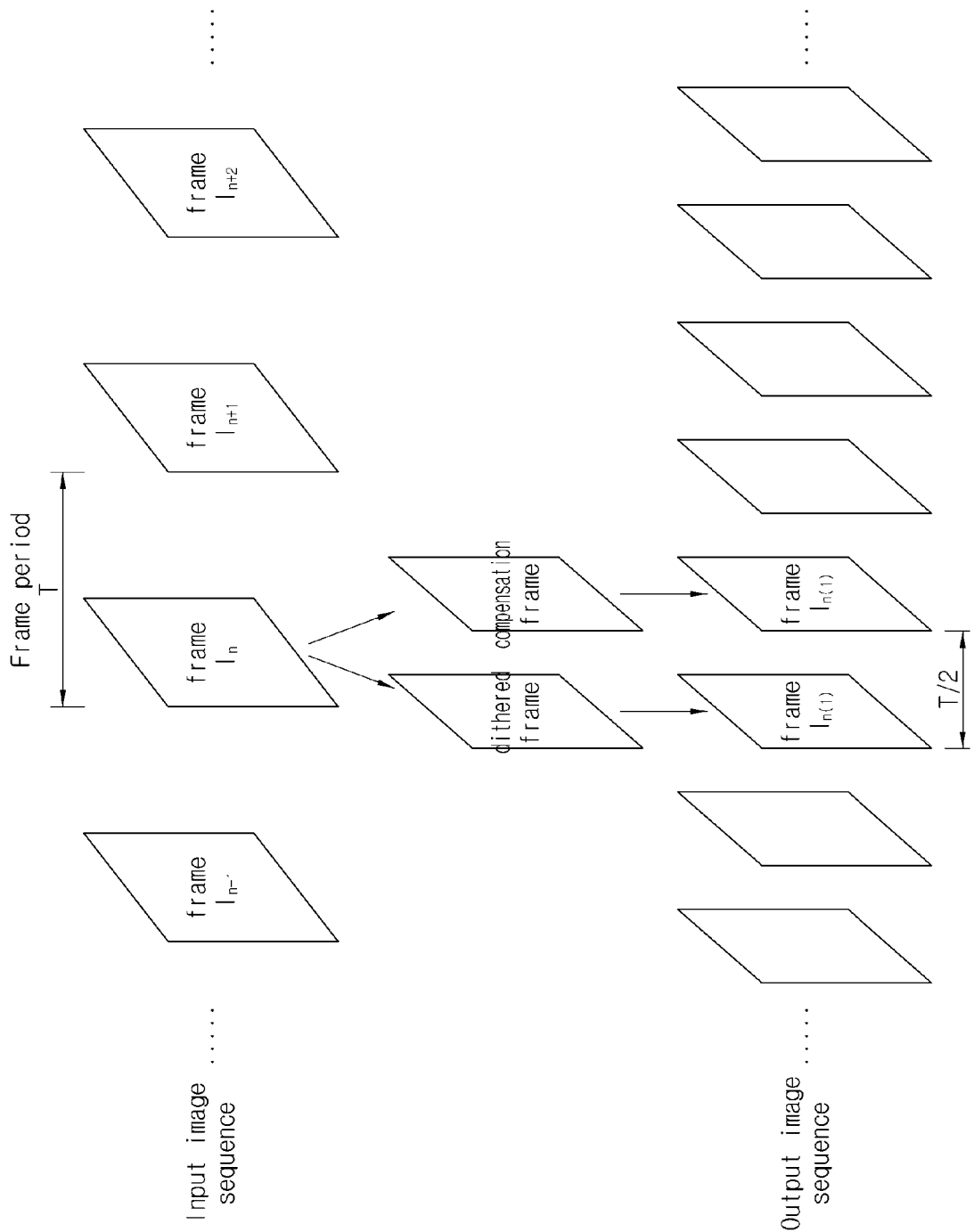

METHOD FOR IMPROVING IMAGE QUALITY AND DISPLAY APPARATUS

CROSS-REFERENCE TO RELATED PATENT APPLICATION

This application claims priority from Korean Patent Application No. 10-2008-0038280, filed on Apr. 24, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to a display apparatus and a method thereof, and more particularly to a method for improving image quality and a control method thereof.

2. Description of the Related Art

A cathode ray tube (CRT) is a type of display apparatus used generally as a television monitor, a measuring instrument, an information terminal, etc. However, the CRT is not utilized for small and light electric apparatuses because of its bulky size and weight.

Instead of the CRT, flat panel display apparatuses, which are proper for small and light electric apparatuses attract attention. A liquid crystal display (LCD), an organic light emitting display (OLED), and a plasma display panel (PDP) are examples of the flat panel display apparatuses.

The OLED emits light using organic compounds, has a response time which is over 1000 times faster than the LCD, may be driven at less than 15 volts, and may be designed to have a very thin size. For these reasons, the OLED has attracted attention as a next generation of the flat panel display apparatus.

If the OLED displays the same image for a long time, the life time of the OLED is reduced. A sticking phenomenon, that is, a previously displayed image still remains in a screen of the OLED, happens when changing the displayed image.

SUMMARY OF THE INVENTION

An aspect of the present invention is to provide a method for improving image quality which prevents the sticking phenomenon and extends life time of the display apparatus by changing displayed pixel values for preventing pixels having the same values from being displayed for a certain time and a display apparatus thereof.

According to an aspect of the invention, there is provided a method for improving image quality comprising generating a plurality of sub-frame images using a frame image depending on whether the frame image is a moving image or a still image, and displaying the plurality of sub-frame images sequentially for a frame time interval of the frame image.

Pixel values of at least two sub-frame images among the plurality of sub-frame images may be different.

Average pixel values of the plurality of sub-frame images may be the same as pixel values of the frame image.

The plurality of sub-frame images may comprise a first sub-frame image and a second sub-frame image.

If a part of the frame image is a still image, pixels in a part of the first sub-frame image and pixels in a part of the second sub-frame image, which correspond to pixels in the part of the frame image, may have different values from pixel values of the part of the frame image.

The pixel values of the part of the frame image may be between the pixel values of the part of the first sub-frame image and the pixel values of the part of the second sub-frame image.

If a part of the frame image is a moving image, pixels in a part of the first sub-frame image and of the second sub-frame image, which are corresponding to pixels in the part of the frame image may have the same values as pixel values of the part of the frame image.

The part of the frame image may comprise at least one pixel.

The generating the plurality of sub-frame images may comprise generating the plurality of the sub-frame images using at least one of a dither parameter, a scaling parameter, and a low-pass filter.

According to an aspect of the invention, there is provided a method for improving image quality comprising determining whether a part of a frame image is a still image and generating a plurality of sub-frame images comprising parts which correspond to the part of the frame image and have different pixel values from the pixel values of the part of the frame image if the part of a frame image is a still image.

The generating the sub-frame images may comprise generating a part of a first sub-frame image and a part of a second sub-frame image which correspond to the part of the frame image and have different pixel values from the part of the frame image, and generating the plurality of sub-frame images comprising the part of the first and second sub-frame images, respectively.

The plurality of sub-frame images may be displayed sequentially for a frame time interval.

Average pixel values of the part of the first sub-frame image and the part of the second sub-frame images may be the same as pixel values of the part of the frame image.

According to an aspect of the invention, there is provided a display apparatus comprising a sub-frame generating unit which generates a plurality of sub-frame images using a frame image depending on whether the frame image is a moving image or a still image and a display unit which displays the plurality of sub-frame images sequentially for a frame time interval of the frame image.

Pixel values of at least two sub-frame images among the plurality of sub-frame images may be different each other.

Average pixel values of the plurality of sub-frame images may be the same as pixel values of the frame image.

The sub-frame generating unit may generate the plurality of sub-frame images comprising a first sub-frame image and a second sub-frame image.

If a part of the frame image is a still image, the sub-frame generating unit may generate the first sub-frame image and the second sub-frame image having parts which correspond to the part of the frame image and which have different pixel values from the pixel values of the part of the frame image.

The pixel values of the part of the frame image may be between the pixel values of the part of the first sub-frame image and the pixel values of the part of the second sub-frame image.

If a part of the frame image is a moving image, the sub-frame generating unit may generate the first sub-frame image and the second sub-frame image having parts which correspond to the part of the frame image and which have the same pixel values as the pixel values of the part of the frame image.

The part of the frame image may comprise at least one pixel.

The sub-frame generating unit may generate the plurality of the sub-frame images using at least one of a dither parameter, a scaling parameter, and a low-pass filter.

According to an aspect of the invention, there is provided a display apparatus comprising a motion detecting unit which determines whether a part of a frame image is a still image, and a sub-frame generating unit which generates a plurality of sub-frame images comprising parts which correspond to the part of the frame image and have different pixel values from the pixel values of the part of the frame image if the part of the frame image is a still image.

The sub-frame generating unit may generate a part of a first sub-frame image and a part of a second sub-frame image which correspond to the part of the frame image and have different pixel values from the part of the frame image and generates the plurality of sub-frame images comprising the part of the first and second sub-frame images, respectively.

The display apparatus may further comprise a display unit which displays the plurality of sub-frame images sequentially for a frame time interval.

Average pixel values of the part of the first sub-frame image and the part of the second sub-frame images may be the same as pixel values of the part of the frame image.

BRIEF DESCRIPTION OF THE DRAWINGS

The above and other aspects and features of the present invention will be apparent from the following detailed description of exemplary embodiments taken in conjunction with the accompanying drawings, in which:

FIG. 2 illustrates a series of frame images input to a display apparatus and sub-frame images displayed on a display unit by a time line according to an exemplary embodiment of the present invention;

DETAILED DESCRIPTION OF EXEMPLARY EMBODIMENTS OF THE INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are merely specific details provided to assist those of ordinary skill in the art in a comprehensive understanding of the invention, and the present invention is only defined within the scope of the appended claims.

Figure 1:
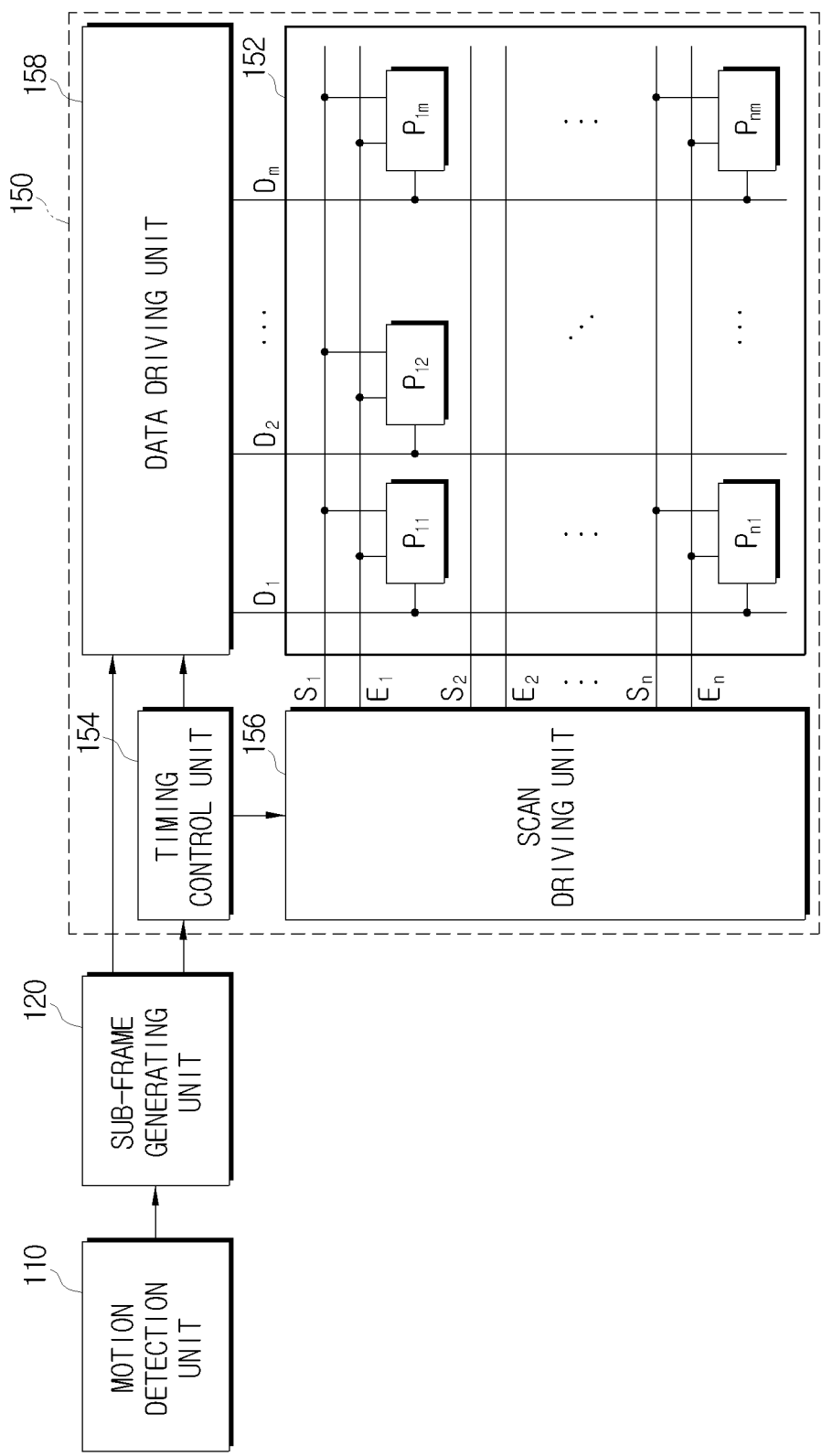
FIG. 1 illustrates a block diagram of a display apparatus according to an exemplary embodiment of the present invention.

FIG. 1 illustrates a block diagram of a display apparatus according to an exemplary embodiment of the present invention. The display apparatus according to this exemplary embodiment of the present invention enables a user to view a broadcast program received from a broadcasting station or an image stored in a storage medium of the display apparatus.

Referring to FIG. 1, the display apparatus 1 includes a motion detection unit 110, a sub-frame generating unit 120, and a display unit 150.

The motion detection unit 110 receives an image on a frame by frame basis, detects motion, and sends the detection result to the sub-frame generating unit 120. In detail, the motion detection unit 110 separates a current frame image which is input into a plurality of partial images, compares the partial images of the current frame image with corresponding partial images of a previous frame image which was previously input, and detects motion of the partial images.

For example, the motion detection unit 110 separates the current frame image into two partial images, i.e., a first partial image and a second partial image, compares pixel values of the first and second partial images with corresponding pixel values of the first and second partial images in the previous frame image, and determines the current first or second partial image as a still image if difference in pixel values is less than a predetermined value and as a moving image if difference in pixel values is more than a predetermined value. The motion detection unit 110 sends the determination result to the sub-frame generating unit 120.

Hereafter, the case where the motion detection unit 110 detects motion by the partial image is explained.

The sub-frame generating unit 120 generates a plurality of sub-frame images using the result of the motion detection in the motion detection unit 110. If the current frame image is a moving image, that is, the current frame image is different from the previous frame image as a whole, the sub-frame generating unit 120 generates a plurality of sub-frame images which are the same as the current frame image. If the current frame image is a still image, that is, the current frame image is the same as the previous frame image as a whole, the sub-frame generating unit 120 generates a plurality of sub-frame images which are different from the current frame image. If only some of the current partial images are the same as the previous partial images, the sub-frame generating unit 120 generates a plurality of sub-frame images which are different from the current frame image only in the parts where the current partial images are the same as the previous partial images.

It is desirable that average pixel values in the sub-frame images are the same as the pixel values of the current frame image, even though the plurality of the sub-frame images are different from each other. A user may recognize that the plurality of the sub-frame images are displayed as that the current frame image is displayed.

The display unit 150 may include an organic electroluminescence display unit 152, a timing control unit 154, a scan driving unit 156, and a data driving unit 158.

The organic electroluminescence display unit 152 includes a plurality of data lines D1 to Dm disposed in rows, a plurality of scan lines S1 to Sn disposed in columns, a plurality of luminescence control lines E1 to En disposed in columns, and a plurality of pixel circuits P11 to Pnm. The pixel circuits P11 to Pnm are located at cross areas of the plurality of data lines D1 to Dm, the plurality of scan lines S1 to Sn, and the plurality of luminescence control lines E1 to En.

The timing control unit 154 controls the data driving unit 158 and the scan driving unit 156 using a synchronizing signal. The timing control unit 154 generates first control signal for controlling the data driving unit 158 using a vertical synchronizing signal and second control signal for controlling the scan driving unit 156 using a horizontal synchronizing signal.

The timing control unit 154 controls the data driving unit 158 and the scan driving unit 156 adaptively based on the number of sub-frame images generated in the sub-frame generating unit 120. For example, if the sub-frame generating unit 120 generates two sub-frame images using one frame image, the timing control unit 154 controls the data driving unit 158 and the scan driving unit 156 with double speed in the synchronizing signals. As a result, display of the images may not be delayed even if the number of images to be displayed increases.

The scan driving unit 156 is connected to the plurality of pixel circuits P11 to Pnm through the plurality of scan lines S1 to Sn and the plurality of luminescence control lines E1 to En. The scan driving unit 156 sends scan signals for selection to the plurality of pixel circuits P11 to Pnm through the plurality of scan lines S1 to Sn, and the luminescence control signals for controlling the time of luminescence to the plurality of pixel circuits P11 to Pnm through the plurality of luminescence control lines E1 to En.

The data driving unit 158 is connected to the plurality of data lines D1 to Dm and sends data signals for the pixel circuits selected by the scan signal of the scan driving unit 156 to the selected pixel circuits. Driving currents corresponding to the data signals are generated and sent to pixels in the selected pixel circuits so that light is emitted from the pixels.

A method for the sub-frame generating unit 120 to generate a plurality of sub-frame images based on one frame image will now be explained. For example, a case that the sub-frame generating unit 120 generates two sub-frame images based on one frame image is explained.

FIG. 2 illustrates a series of frame images input to the display apparatus according to an embodiment of the present invention and sub-frame images displayed on the display unit 150 by a time line.

Referring to FIG. 2, a time interval (frame period) of the frame images input to the sub-frame generating unit 120 is T. Each frame image is divided into two sub-frames. The sub-frame images are displayed on the display unit 150 with a time interval of T/2.

The sub-frame generating unit 120 generates two same sub-frame images if the frame image is a moving image and generates two different sub-frame images if the frame image is a still image.

In detail, if the frame image is divided into two regions and the image in first region, which is first partial frame image, is a moving image and the image in second region, which is second partial frame image, is a still image, the sub-frame generating unit 120 generates first partial sub-frame image and second partial sub-frame image which have the same pixel values as the first partial frame image and generates third and fourth partial sub-frame images which have different pixels values from the second partial frame image. The sub-frame generating unit 120 generates first sub-frame image by combining the first and the third partial sub-frame images and generates second sub-frame image by combining the second and the fourth partial sub-frame images.

If a partial frame image is a still image, one of the partial sub-frame images generated by the sub-frame generating unit 120 is called as a dithered image and the other is called as a compensated image.

There may be three kinds of methods for generating the dithered image. First, the sub-frame generating unit 120 generates a dithered image by adding a dither parameter value to the pixel values of the partial frame image and generates a compensated image by subtracting the dither parameter value from the pixel values of the partial frame image. Average pixel values of the dithered image and the compensated image is the same as the pixel values of the partial frame image. The dither parameter value may be a fixed value, a random value, or a value having a functional relation with the pixel values of the partial frame image. It is desirable for the dither parameter value to be stored in the sub-frame generating unit 120 in advance. If range of the pixel value is 0 to 255 and the pixel value of the dithered image is greater than 255, it is desirable for the pixel value of the dithered image to be limited to the value lower than 255. The pixel value of the dithered image may be calculated by Equation (1) as follows:

$$I_{n(1)}(i,j)=\min(\min(255, 2*I_n(i,j)), \max(\max(0, 2*I_n(i,j)-255), \sigma(i,j))), \quad (1)$$

wherein there are N×M partial frame images (i=1, 2, ..., N; j=1, 2, ..., M), In(i, j) is a pixel value of (i, j)th partial frame image, In(1)(i, j) is a pixel value of (i, j)th dithered image, and σ(i, j) is a dither parameter value.

A second method for generating a dithered image is to generate dithered image by multiplying a predetermined scaling parameter value by the pixel values of the partial frame image. A compensated image is generated for average pixel values of the dithered image and the compensated image to be the same as the pixel values of the partial frame image. The scaling parameter is for changing a resolution of an image and is desirable to be a fixed value. The pixel value of the dithered image may be calculated by Equation (2) as follows:

$$I_{n(1)}(i,j)=R*I_n(i,j), \quad (2)$$

wherein R is a scaling parameter, In(i, j) is a pixel value of (i, j)th partial frame image, and In(1)(i, j) is the pixel value of (i, j)th dithered image.

Third method for generating a dithered image is to generate dithered image by low-pass filtering the partial frame image. The pixel value of the dithered image may be calculated by Equation (3) as follows:

$$I_{n(1)}(i,j)=\mathrm{LPF}(I_n(i,j)), \quad (3)$$

wherein LPF is a low-pass filter, In(i, j) is a pixel value of (i, j)th partial frame image, and In(1)(i, j) is a pixel value of (i, j)th dithered image, which is a low-pass filtered value of In(i, j).

To make average pixel values of the dithered image and the compensated image be the same as the pixel values of the partial frame image, the pixel value of the compensated image may be calculated by Equation (4) as follows:

$$I_{n(2)}(i,j)=2*I_n(i,j)-I_{n(1)}(i,j), \quad (4).$$

wherein In(2)(i, j) is a pixel value of (i, j)th compensated image, In(i, j) is a pixel value of (i, j)th partial frame image, and In(1)(i, j) is a pixel value of (i, j)th dithered image.

It is desirable for the average pixel values of the dithered image and the compensated image to be the same as the pixel values of the partial frame image. It is also desirable for the pixel values of the partial frame image is a value between the pixel values of the dithered image and the compensated image. Other methods for generating a dithered image and a compensated image may be implemented.

Figure 3A:
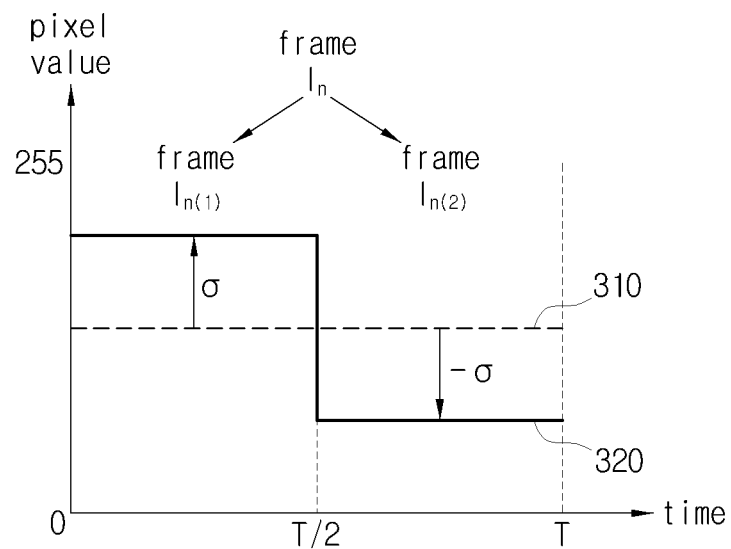
FIGS. 3A and 3B illustrates pixel values of a partial frame image, a dithered image, and a compensated image according to an embodiment of the present invention.
Figure 3B:
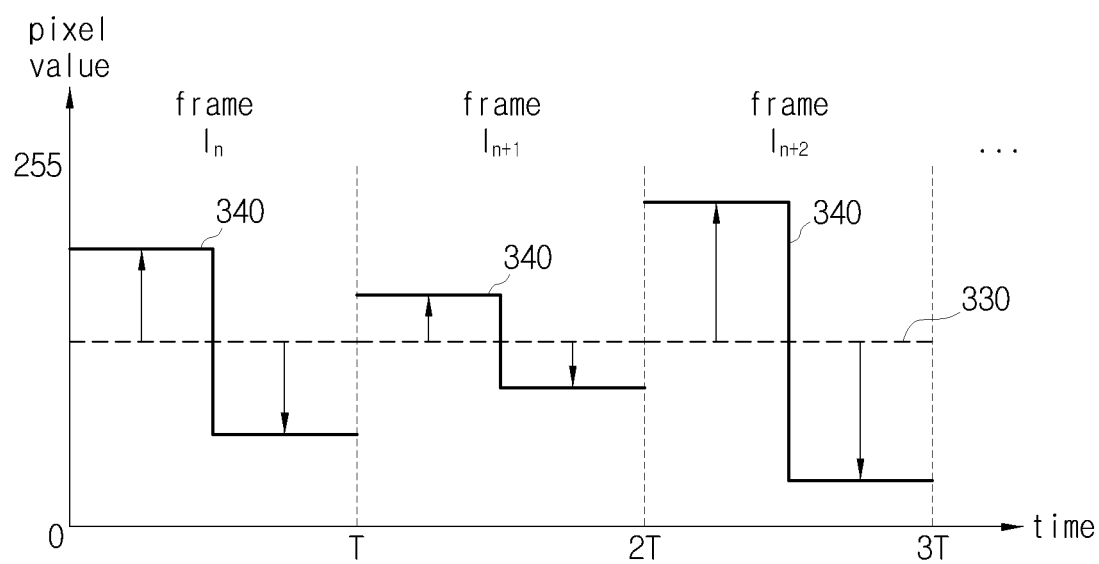

FIGS. 3A and 3B illustrates pixel values of the partial frame image, the dithered image, and the compensated image according to an exemplary embodiment of the present invention.

FIG. 3A illustrates pixel values of a partial frame image, a dithered image, and a compensated image for one frame time interval T. Referring to FIG. 3A, a partial frame image having a fixed pixel value 310 is displayed for one frame time interval T if the exemplary embodiment of the present invention is not applied. On the other hand, a dithered image and a compensated image which are different pixel values 320 are displayed for one frame time interval T if the exemplary embodiment of the present invention is applied so that the sticking phenomenon may be prevented.

FIG. 3B illustrates pixel values of partial frame images, dithered images, and compensated images for three frame time interval 3T. A case that three partial frame images are still images, that is, the partial frame images have same pixel value 330 for three frame time interval 3T is illustrated in FIG. 3B. If variable dither parameter is applied, each dithered image and compensated image which have different pixel values 340 for each of three frame time interval 3T. As a result, the sticking phenomenon may be prevented and life time of the display apparatus may be extended.

Figure 4:
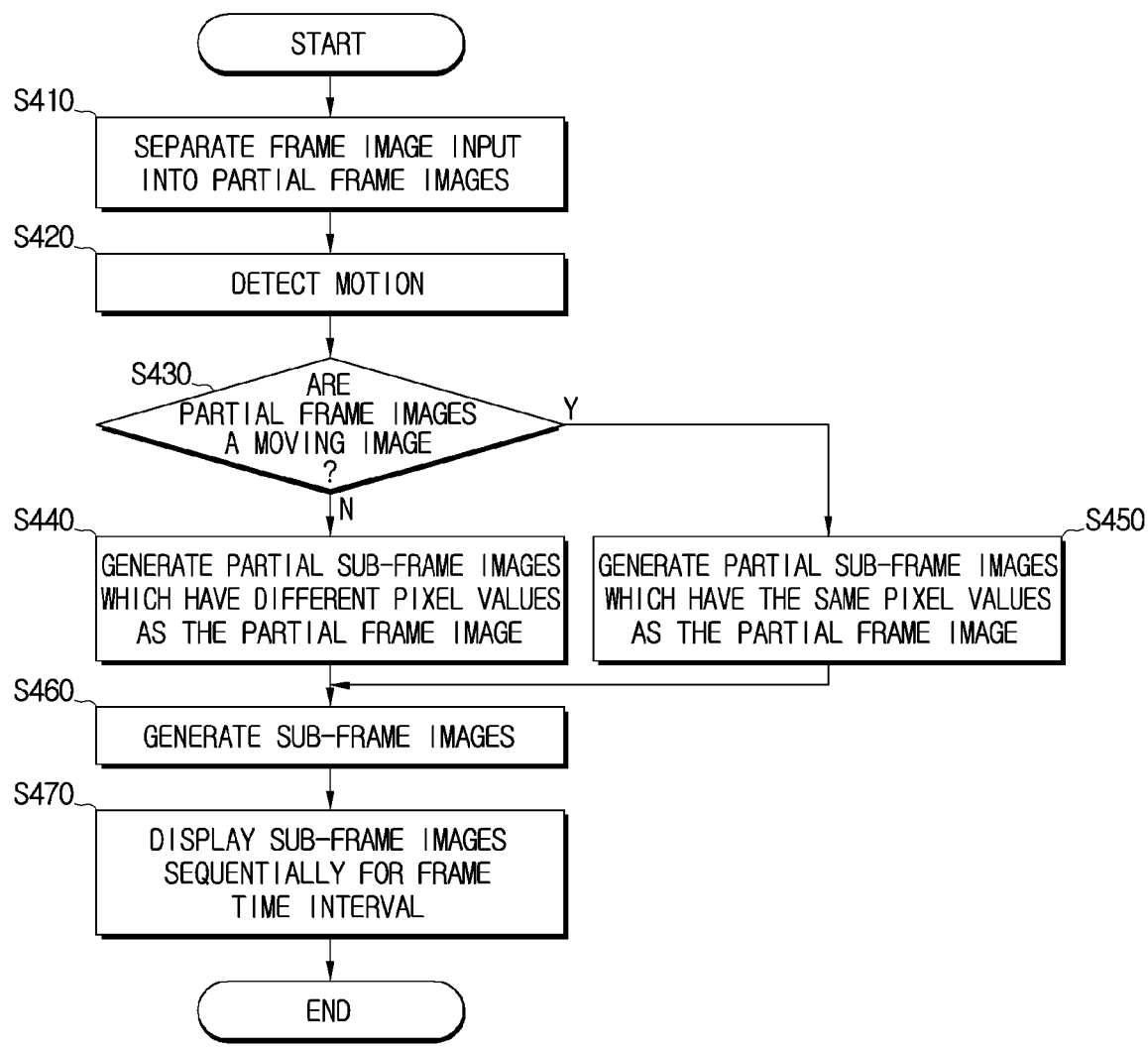
FIG. 4 is a flow chart of method for generating two sub-frame images using one frame image according to an exemplary embodiment of the present invention.

FIG. 4 is a flow chart of method for generating two sub-frame images using one frame image according to an exemplary embodiment of the present invention.

Referring to FIG. 4, the motion detecting unit 110 separates a current frame image input into a plurality of partial frame images (S410). A case that the frame image is separated into a first partial frame image and a second partial image will be explained.

The motion detecting unit 110 detects motion of each partial frame image (S420). In detail, the motion detecting unit 110 compares pixel values of the each partial frame of the current frame image with pixel values of each partial frame of previous frame image. If differences between pixel values are less than a predetermined critical value, the partial frame image is determined as a still image. If differences between pixel values are more than the predetermined critical value, the partial frame image is determined as a moving image. The motion detecting unit 110 sends a determined result to the sub-frame generating unit 120.

If the first or second partial frame image is a still image (S430-N), the sub-frame generating unit 120 generates a plurality of partial sub-frame images which have different pixel values from the partial frame image (S440). For example, if the first partial frame image is a still image, the sub-frame generating unit 120 generates a first partial sub-frame image and a second partial sub-frame image which have different pixel values from the first partial image. The first partial sub-frame image is called a dithered image and the second partial sub-frame image is called a compensated image.

If the first or second partial frame image is a moving image (S430-Y), the sub-frame generating unit 120 generates a plurality of partial sub-frame images which have the same pixel values as the partial frame image (S450). For example, if the second partial frame image is a moving image, the sub-frame generating unit 120 generates a third partial sub-frame image and a fourth partial sub-frame image which have the same pixel values as the second partial image.

The sub-frame generating unit 120 generates a plurality of sub-frame images using the plurality of partial sub-frame images (S460). For example, the sub-frame generating unit 120 generates first sub-frame image by adding the third partial sub-frame image to the first partial sub-frame image which is the dithered image and generates second sub-frame image by adding the fourth partial sub-frame image to the second partial sub-frame image which is the compensated image.

The display unit 150 displays the plurality of sub-frame images sequentially for the frame time interval (S470).

The above-described processes of detecting motion of the frame image, generating a plurality of sub-frame images which have different pixel values from the frame image based on a result of detection, and displaying the plurality of sub-frame images sequentially for a frame time interval improve image quality by reducing sticking phenomenon and extend a life time of the display unit 150.

Exemplary embodiments which separate a frame image into a plurality of partial frame images and determine that the plurality of partial frame images are moving images or still images by the partial frame image are described. However, other embodiments which determine that the frame image is a moving image or a still image by the frame image or which determine that each pixel is a moving pixel or a still pixel by the pixel are possible.

Exemplary embodiments which determine whether to move by differences in pixel values are described. However, other embodiments which determine whether to move by moving distances or by motion vectors are possible.

Exemplary embodiments which use the organic electroluminescence display are described. However, other embodiments which use any display unit which has the sticking phenomenon or the afterimage effect are possible.

Exemplary embodiments which generate two sub-frame images are described. However, other embodiments which generate more than two sub-frame images are possible. For example, the timing control unit 154 may increase the speed of the synchronizing signals in that case.

Exemplary embodiments which generate a plurality of different sub-frame images if the frame image is a still image and generate a plurality of same sub-frame images if the frame image is a moving image are described. However, other embodiments which use the original frame image without generating a plurality of same sub-frame images if the frame image is a moving image are possible. For example, the timing control unit 154 does not need to double the speed of the synchronizing signals in that case.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for improving image quality, the method comprising:

generating a plurality of sub-frame images from a current frame image, wherein the plurality of sub-frame images comprise a first sub-frame image and a second sub-frame image; and determining whether the current frame image is a moving image or a still image based on a difference between a previous image and the current image;

displaying the generated plurality of sub-frame images sequentially for one frame display time, wherein the plurality of sub-frame images are generated to be different from the current frame image if the current frame image is the still image, and the plurality of sub-frame images are generated to be equal to the current frame image if the current frame image is not the still image, and wherein if a part of the frame image is a still image, pixels in a part of the first sub-frame image and pixels in a part of the second sub-frame image, which correspond to pixels in the part of the frame image, have values which are different from pixel values of the part of the frame image.

2. The method of claim 1, wherein pixel values of at least two sub-frame images among the plurality of sub-frame images are different.

3. The method of claim 1, wherein average pixel values of the plurality of sub-frame images are the same as pixel values of the frame image.

4. The method of claim 1, wherein the pixel values of the part of the frame image are between the pixel values of the part of the first sub-frame image and the pixel values of the part of the second sub-frame image.

5. The method of claim 1, wherein if a part of the frame image is a moving image, pixels in a part of the first sub-frame image and pixels in a part of the second sub-frame image, which correspond to pixels in the part of the frame image, have values which are the same as pixel values of the part of the frame image.

6. The method of claim 1, wherein the part of the frame image comprises at least one pixel.

7. The method of claim 1, wherein the generating the plurality of sub-frame images comprises generating the plurality of the sub-frame images using at least one of a dither parameter, a scaling parameter, and a low-pass filter.

8. A method for improving image quality comprising:
  determining whether a part of a frame image is a still image;
  generating a plurality of sub-frame images from a current image; and
  displaying the generated plurality of sub-frame images sequentially for one frame display time,
  wherein the plurality of sub-frame images are generated to be different from the current frame image if the current frame image is the still image, and the plurality of sub-frame images are generated to be equal to the current frame image if the current frame image is not the still image, and
  wherein the generating the sub-frame images comprises generating a part of a first sub-frame image and a part of second sub-frame image which correspond to the part of the frame image and have pixel values which are different from the part of the frame image and generating the plurality of sub-frame images comprising the part of the first and second sub-frame images, respectively.

9. The method of claim 8, wherein the plurality of sub-frame images are displayed sequentially for a frame time interval.

10. The method of claim 8, wherein average pixel values of the part of the first sub-frame image and the part of the second sub-frame image are the same as pixel values of the part of the frame image.

11. A display apparatus comprising:
  a sub-frame generating unit which determines whether a current frame image is a moving image or a still image based on a difference between a previous image and the current image, and generates a plurality of sub-frame images comprising a first sub-frame image and a second sub-frame image from the current frame image; and
  a display unit which displays the generated plurality of sub-frame images sequentially for one frame time,
  wherein the plurality of sub-frame images are generated to be different from the current frame image if the current frame image is the still image, and the plurality of sub-frame images are generated to be equal to the current frame image if the current frame image is the still image, and
  wherein if a part of the frame image is a still image, the sub-frame generating unit generates the first sub-frame image and the second sub-frame image having parts which correspond to the part of the frame image and which have pixel values which are different from the pixel values of the part of the frame image.

12. The display apparatus of claim 11, wherein pixel values of at least two sub-frame images among the plurality of sub-frame images are different each other.

13. The display apparatus of claim 11, wherein average pixel values of the plurality of sub-frame images are the same as pixel values of the frame image.

14. The display apparatus of claim 11, wherein the pixel values of the part of the frame image are between the pixel values of the part of the first sub-frame image and the pixel values of the part of the second sub-frame image.

15. The display apparatus of claim 11, wherein if a part of the frame image is a moving image, the sub-frame generating unit generates the first sub-frame image and the second sub-frame image having parts which correspond to the part of the frame image and which have the same pixel values which are the same as the pixel values of the part of the frame image.

16. The display apparatus of claim 11, wherein the part of the frame image comprises at least one pixel.

17. The display apparatus of claim 11, wherein the sub-frame generating unit generates the plurality of the sub-frame images using at least one of a dither parameter, a scaling parameter, and a low-pass filter.

18. A display apparatus comprising:
  a motion detecting unit which determines whether a part of a frame image is a still image;
  a sub-frame generating unit which generates a plurality of sub-frame images from a current image; and
  a display unit which displays the generated plurality of sub-frame images sequentially for one frame display time,
  wherein the plurality of sub-frame images are generated to be different from the current frame image if the current frame image is the still image, and the plurality of sub-frame images are generated to be equal to the current frame image if the current frame image is not the still image, and
  wherein the sub-frame generating unit generates a part of a first sub-frame image and a part of second sub-frame image which correspond to the part of the frame image and have pixel values which are different from the part of the frame image, and generates the plurality of sub-frame images comprising the part of the first and second sub-frame images, respectively.

19. The display apparatus of claim 18, wherein the display unit displays the plurality of sub-frame images sequentially and does not display the frame image for a frame time interval.

20. The display apparatus of claim 18, wherein average pixel values of the part of the first sub-frame image and the part of the second sub-frame image are the same as pixel values of the part of the frame image.

* * * * *